No. 640,097. Patented Dec. 26, 1899.
W. S. & C. I. CORBY.
PROCESS OF MAKING AND WORKING DOUGH.
(Application filed Oct. 16, 1899.)
(No Model.)
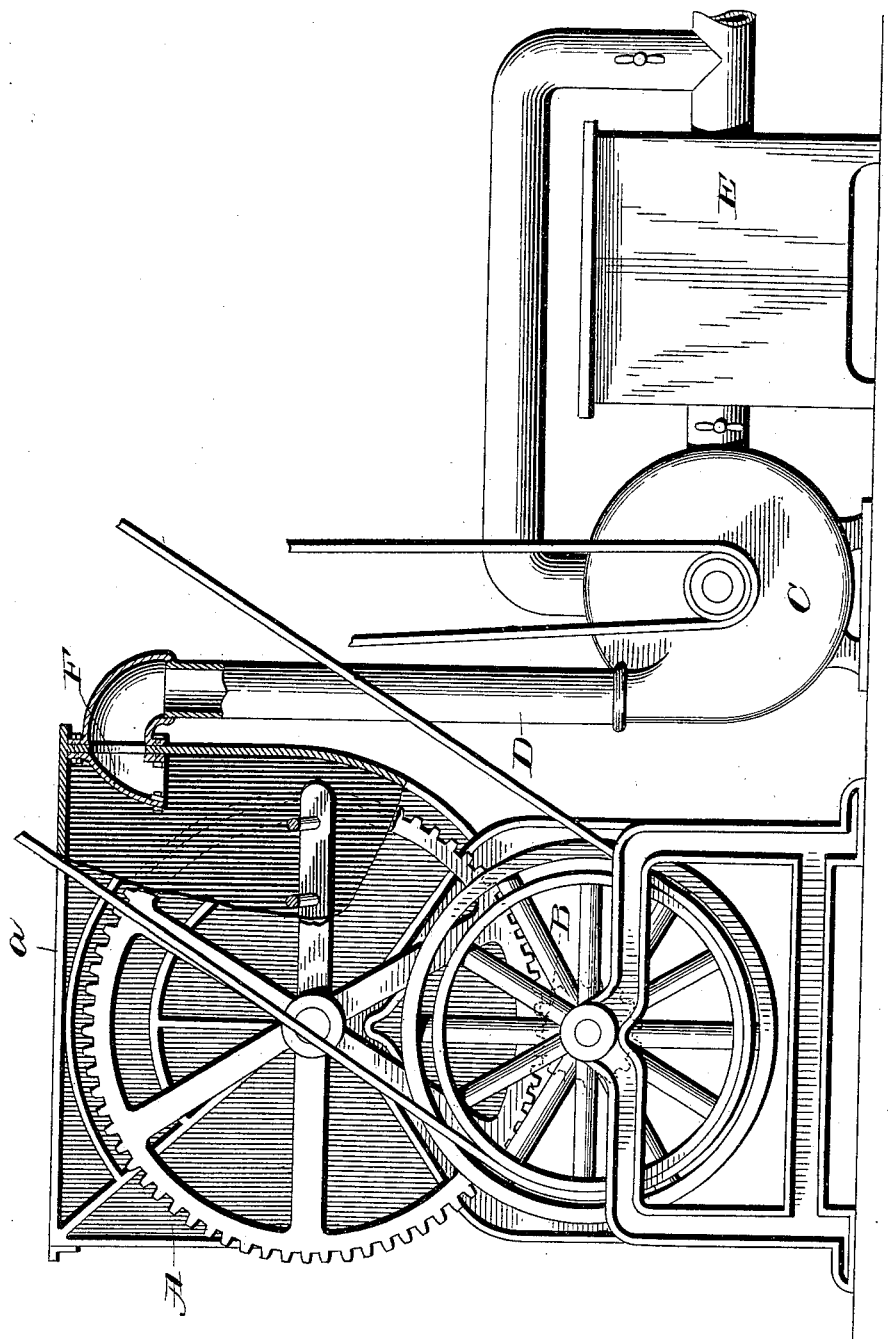
WITNESSES
L. C. Hills
Wm. F. Doyle.
INVENTORS:
William S. Corby and
Charles I. Corby.
By J. S. Barker, their Attorney.
THE NORRIS PETERS CO., PHOTO-LITHO., WASHINGTON, D. C.

UNITED STATES PATENT OFFICE.

WILLIAM S. CORBY AND CHARLES I. CORBY, OF WASHINGTON, DISTRICT OF COLUMBIA.

PROCESS OF MAKING AND WORKING DOUGH.

SPECIFICATION forming part of Letters Patent No. 640,097, dated December 26, 1899.

Application filed October 16, 1899. Serial No. 733,770. (No specimens.)

*To all whom it may concern:*

Be it known that we, WILLIAM S. CORBY and CHARLES I. CORBY, citizens of the United States, residing at Washington, in the District of Columbia, have invented a certain new and Improved Process of Making and Working Dough, of which the following is a specification.

Our invention relates in a general way to the process of making and manipulating dough which is set forth in our Patent No. 629,239, dated July 18, 1899; and the invention has for its object to improve the process of dough manufacture and manipulation, as will be hereinafter described, whereby several important advantages are attained, particularly with reference to a thorough and proper aeration of the dough, to the maintaining of the same at proper conditions of temperature during the operations and manipulations to which it is subjected, and to other improved features of treatment, which will be hereinafter pointed out.

Among the peculiar and distinguishing features of our process are the thorough dissemination of air through the entire mass of dough while it is being mixed or worked in order to thoroughly aerate the dough and the drawing out, shredding, or sheeting of the dough after it has been formed into a coherent mass, which latter operations tend to facilitate the complete and perfect union between the water or other liquid supplied as one of the dough ingredients and the various constituents of the flour, particularly those which when united with the liquid form gluten, and which operations also tend to facilitate the permeation of the entire dough mass with air. The thorough and complete permeation of the dough mass with air not only tends to make the mass light and porous, but also supplies oxygen in a manner to greatly hasten and invigorate the growth of the yeast, and also, as we have been led to believe, so as to oxidize certain substances in the flour which are found to have a deleterious effect in the formation of gluten and in the general appearance of the dough if allowed to remain therein in an unoxidized condition.

We have discovered that in carrying out our process of dough manufacture by means of an apparatus such as we employ and which is indicated in a general way in the accompanying drawing considerable heat is generated during the working of the dough, and that unless provision is made for keeping down such heat the dough may become so hot as to be injuriously affected. It is well known that the process of fermentation tends to develop heat in the fermenting mass and it may be, and we believe, that the heat which becomes apparent in the mixing of dough according to our process is due to a certain extent, at least, to the very active fermentation which takes place during the mixing and working of the dough according to our method or process.

We have also discovered that the temperature of the dough may be controlled with great nicety, and at the same time the quality of the dough produced will be improved if air be supplied to the mass of dough not only in abundant quantities, but also in constantly-renewed quantities—that is to say, the air which is supplied to the dough is furnished and after performing its functions is passed on or removed and its place taken by a new supply of air. This not only insures that the air which is being used shall contain its maximum quantity of free oxygen, but also that the air shall act as a medium whereby the heat generated in the dough shall be conveyed away.

We have also discovered that the best results are attained when the temperature of the air supplied to the dough mass is somewhat lower than the temperature at which the dough should be maintained while being mixed and worked, and which temperature is lower than the ordinary temperature of the air in this latitude during the summer season. We therefore cool the air when its natural temperature is too high to give the best results when supplied to the dough, as has been hereinbefore stated.

In order that our invention may be the better understood, we have in the accompanying drawing illustrated in side elevation an apparatus by means of which our process may be carried into effect.

In such drawing, A represents a vessel or casing in which the dough is mixed and worked.

Within the casing is mounted a horizontally-arranged beating device, which is driven by the gearing B at a speed sufficiently great to cause the shredding and sheeting of the dough hereinbefore referred to and which is fully described in our aforesaid patent.

C indicates a blower or air-forcing apparatus connected with the casing A by a pipe D.

E represents an air-cooling apparatus which is connected with the fan or blower, so that air may be passed through the said refrigerator and be cooled before being delivered into the casing. The top of the casing, which is provided with a cover a, may be left sufficiently open to permit of the ready escape of the air which is forced into the casing either by leaving the cover slightly open or by providing suitable escape-openings in the cover or upper part of the casing. The best results are attained when the air is so directed as that it partakes of the same direction of movement as that followed by the beater, and to thus properly direct the air a shield or deflecting-plate F, arranged inside of the casing and opposite the mouth of the pipe D, is usually employed.

In carrying out our process the dough ingredients, including the flour, liquid, and yeast or other ferment employed, are placed within the casing A and the beater is started. We do not usually start the fan or blower until the dough ingredients have been formed into a moist coherent mass, as otherwise the loose and dry flour would be blown out to a disagreeable extent. The operation of the beater within the casing A results in the thorough mixing and blending of the dough and the sheeting and shredding thereof, as described in our aforesaid patent, and at the same time the fan or blower supplies the necessary quantities of air to aerate the dough, as has been herein described.

We are aware that it has been proposed to make an unleavened or unfermented dough in a closed vessel into which was forced air or other gas, as carbonic acid, until a pressure equal to several or many atmospheres was attained; but such processes have never proved successful and differ in many respects from ours. In the first place, so far as we are aware, such processes have always been used in the making of unleavened bread. Again, in carrying out such processes it has not been customary to constantly renew the supply of air and to remove from the mixing vessel or casing the air after it has acted upon the dough, and hence the air could have no cooling effect, but, rather, being compressed into the mixing vessel, would tend to heat the dough.

Having thus described our invention, what we claim, and desire to secure by Letters Patent, is—

1. The herein-described improvement in the art of making dough, which consists in intermingling the constituents of the dough to form a coherent mass, and, after such mass has been formed, rapidly drawing out the said mass into sheets, shreds, or membranes, and blowing or forcing air into the dough while such sheets, shreds, and membranes are being formed, substantially as set forth.

2. The herein-described improvement in the art of making dough, which consists in agitating the dough, supplying air to the dough during such agitation, and cooling the air before it is so supplied, substantially as set forth.

3. The herein-described improvement in the art of making dough, which consists in agitating the dough in the presence of air supplied thereto at a temperature lower than the temperature at which the dough should be maintained during such agitation, substantially as set forth.

4. The herein-described improvement in the art of making fermented dough, which consists in intermingling the constituents of the dough, including a yeast or other ferment, to form a moist coherent mass, agitating such dough mass, and during such agitation supplying air, whereby the dough mass may be permeated therewith, and carrying off the air at substantially the same rate as it is supplied, whereby it may serve as a medium to prevent overheating of the dough, substantially as set forth.

In testimony whereof we have signed our names to this specification in the presence of two subscribing witnesses.

WILLIAM S. CORBY.
CHARLES I. CORBY.

Witnesses:
J. S. BARKER,
GEO. T. MAY, Jr.